US010973352B1

(12) United States Patent
Conner

(10) Patent No.: US 10,973,352 B1
(45) Date of Patent: Apr. 13, 2021

(54) REUSEABLE STRAW CADDY

(71) Applicant: George W. Conner, Monterey, CA (US)

(72) Inventor: George W. Conner, Monterey, CA (US)

(*) Notice: Subject to any disclaimer, the term of this patent is extended or adjusted under 35 U.S.C. 154(b) by 0 days.

(21) Appl. No.: 17/247,695

(22) Filed: Dec. 21, 2020

(51) Int. Cl.
*A47G 19/30* (2006.01)
*B65D 47/06* (2006.01)
*B33Y 80/00* (2015.01)

(52) U.S. Cl.
CPC .......... *A47G 21/184* (2013.01); *B65D 47/06* (2013.01); *B33Y 80/00* (2014.12); *B65D 2543/00083* (2013.01); *B65D 2543/00296* (2013.01)

(58) Field of Classification Search
CPC .......... A47G 21/184; B65D 47/06; B65D 2543/00083; B65D 2543/00296; B65D 83/02; B65D 85/20; B65D 85/26; B33Y 80/00
See application file for complete search history.

(56) References Cited

U.S. PATENT DOCUMENTS

| | | | | |
|---|---|---|---|---|
| 1,982,112 A * | 11/1934 | Lang | ...................... | B65D 85/20 206/380 |
| 2,877,892 A * | 3/1959 | Severson | ............... | A47G 21/12 206/96 |
| 3,063,551 A * | 11/1962 | Russell | .................. | B65D 83/02 312/73 |
| 3,133,663 A * | 5/1964 | Confer | ............... | B65D 43/0222 220/796 |
| 3,815,734 A * | 6/1974 | Kruckel | ................. | A45C 11/34 206/443 |
| 4,180,192 A * | 12/1979 | Breslau | .................. | A45C 11/24 206/391 |
| 5,680,946 A * | 10/1997 | Cochran | ............... | B65D 41/18 215/317 |
| 7,665,612 B2 * | 2/2010 | Turner | ................. | B65D 5/5069 206/575 |
| 2004/0173613 A1* | 9/2004 | Schroeder | .......... | B65D 43/0212 220/276 |
| 2006/0289319 A1* | 12/2006 | Lin | ......................... | A63D 15/10 206/315.1 |
| 2017/0105559 A1* | 4/2017 | Watson | .............. | B65D 75/5833 |

FOREIGN PATENT DOCUMENTS

WO   WO-2010005374 A1 *   1/2010   ............. B65D 85/22

* cited by examiner

*Primary Examiner* — James N Smalley
(74) *Attorney, Agent, or Firm* — Charles L. Thoeming

(57) ABSTRACT

Embodiments of a reusable straw caddy include a hand-held container and dispenser for a plurality of cleaned straight reusable drinking straws. The caddy provides top and bottom portions interlocked once the bottom portion has been filled with cleaned straws. Embodiments provide top portion windows or a translucent top portion giving the user a quick count on how many cleaned straws remain in the caddy as cleaned straws are dispensed. Embodiments of the reusable straw caddy can be manufactured by three-dimensional printing or injection molding.

11 Claims, 12 Drawing Sheets

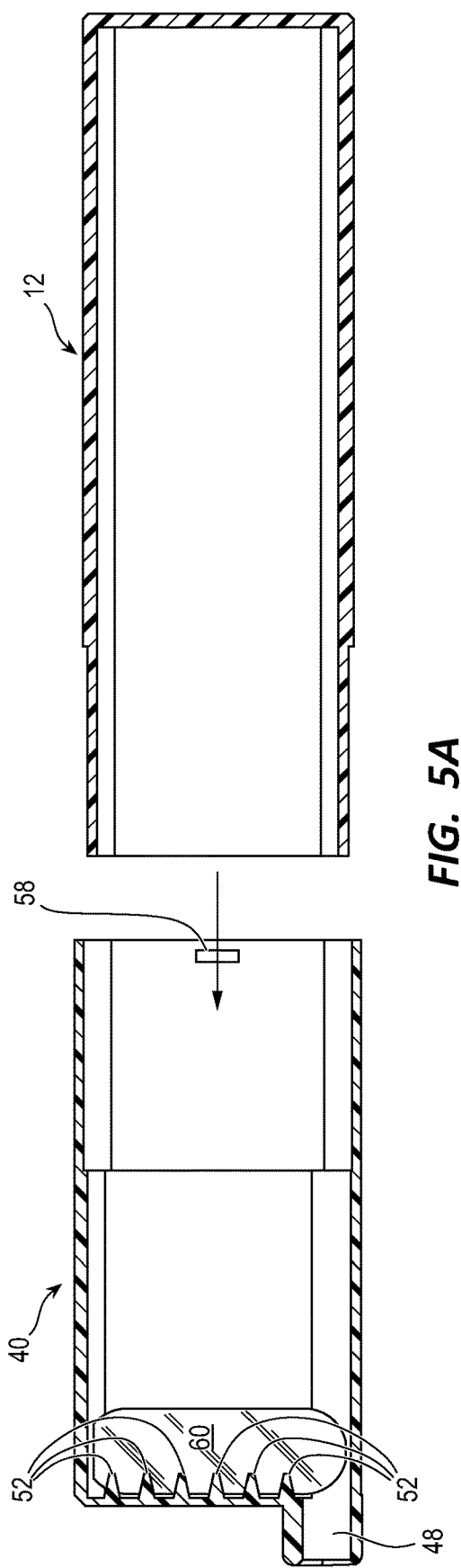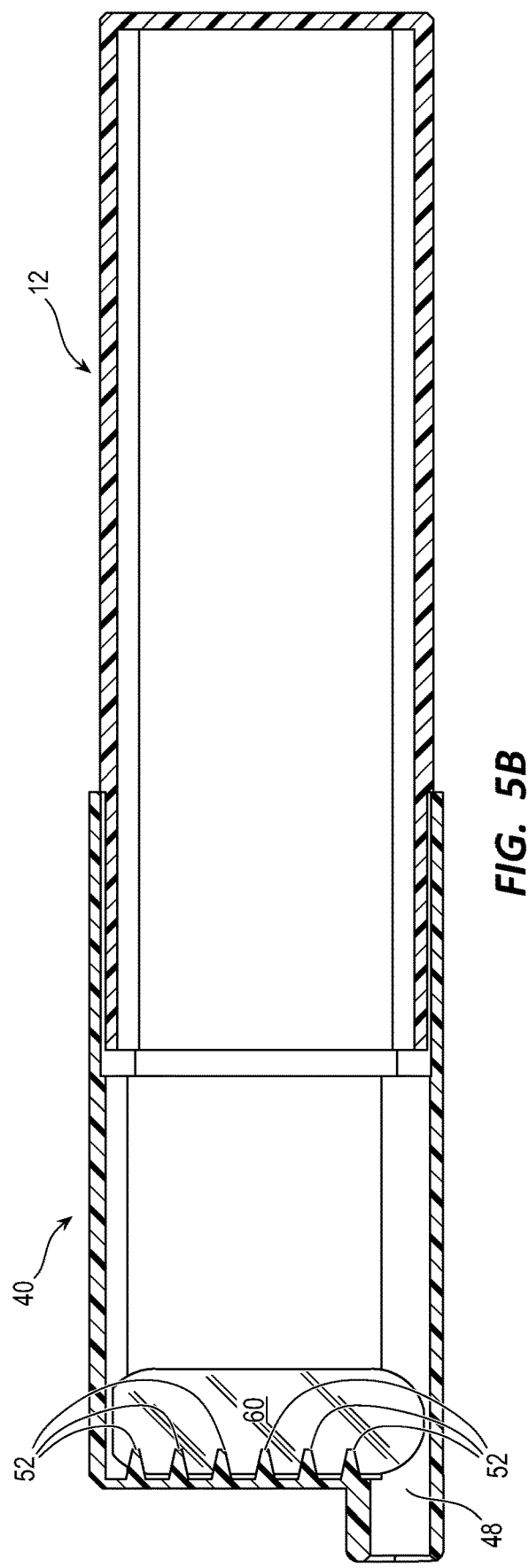

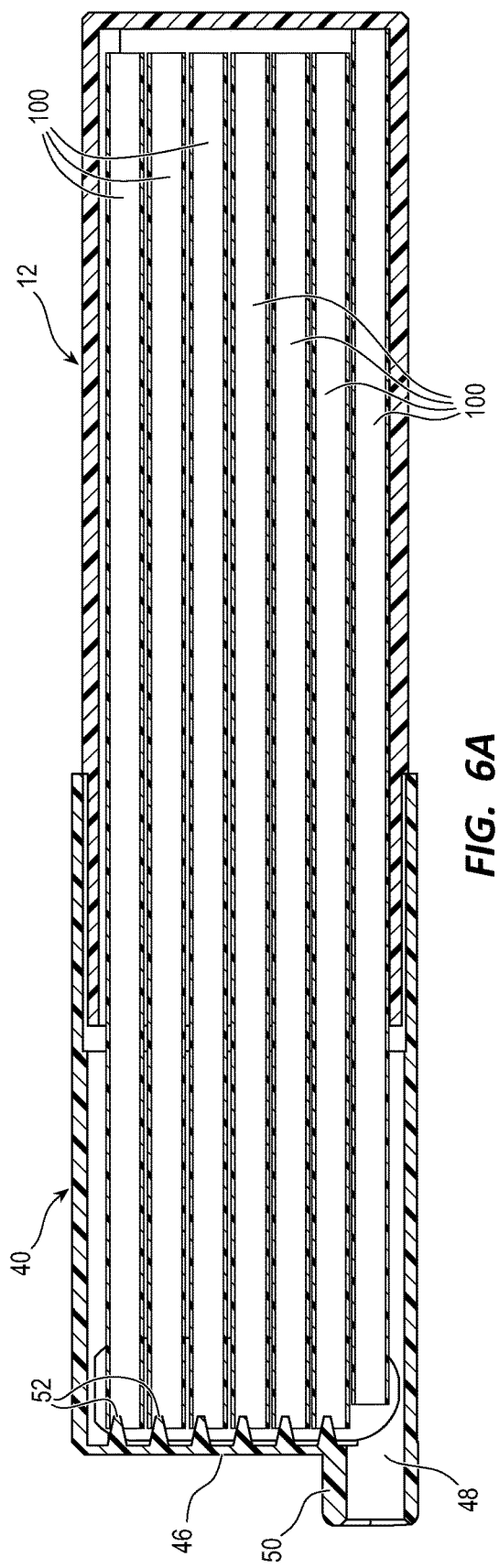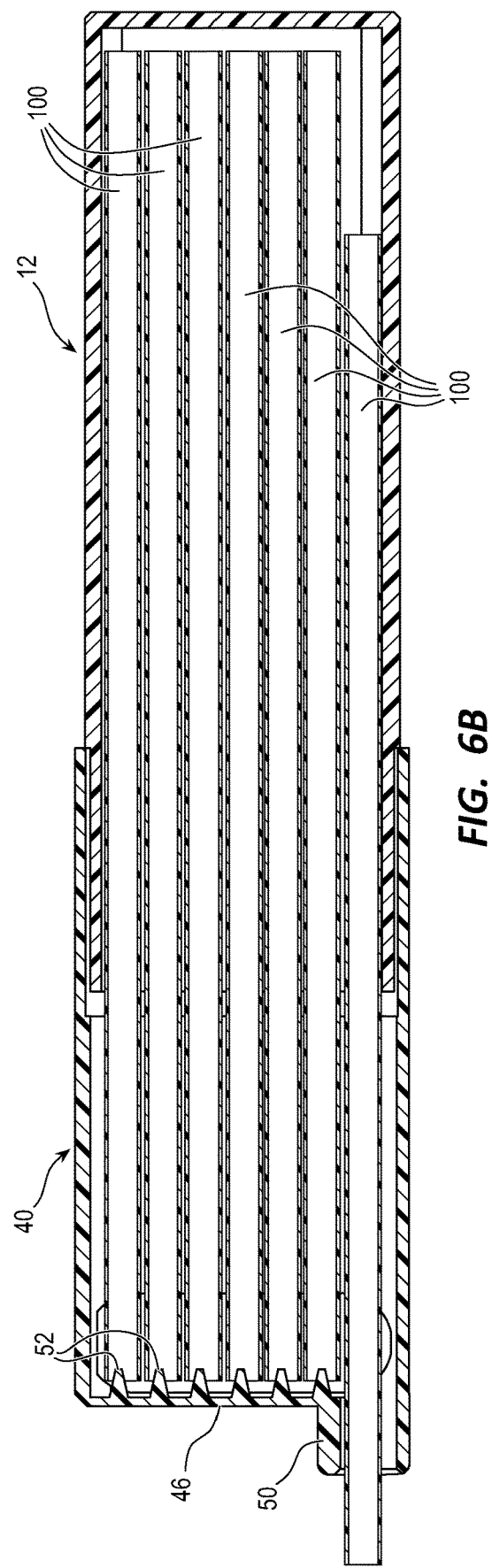
FIG. 6A
FIG. 6B

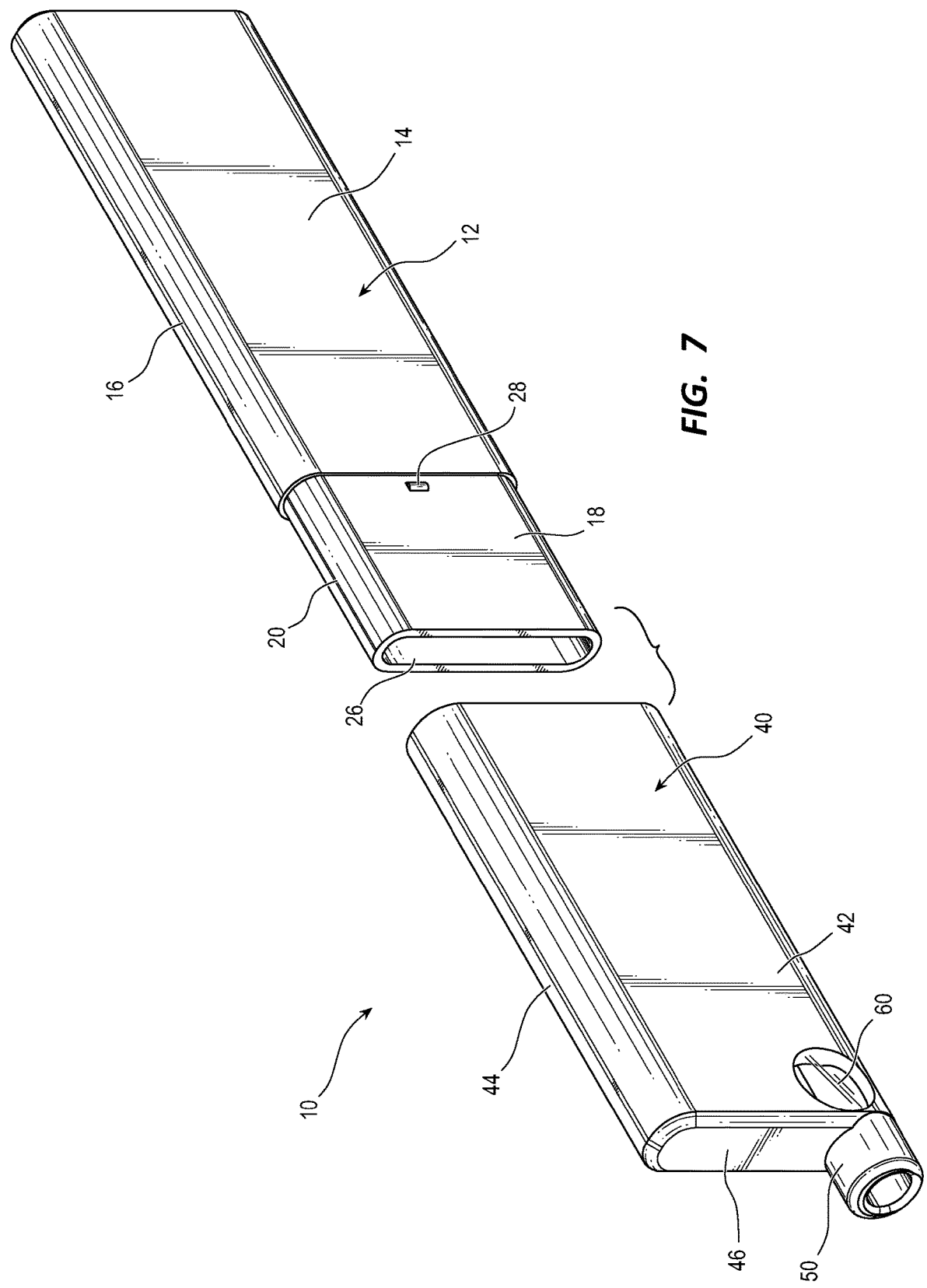

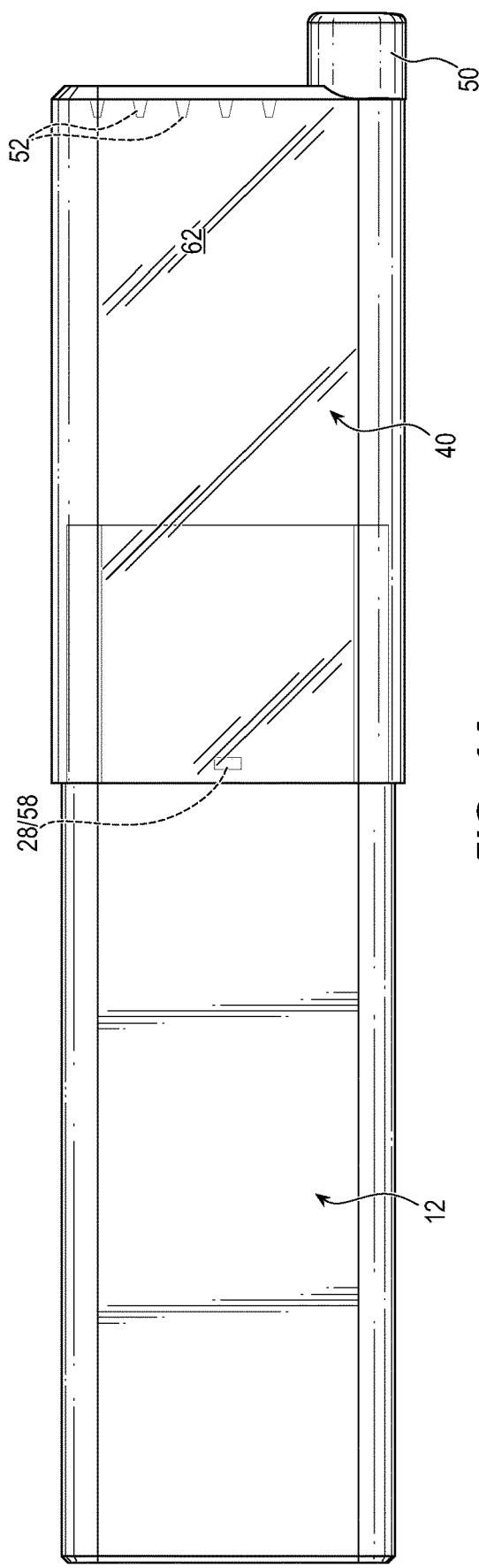
*FIG. 14*
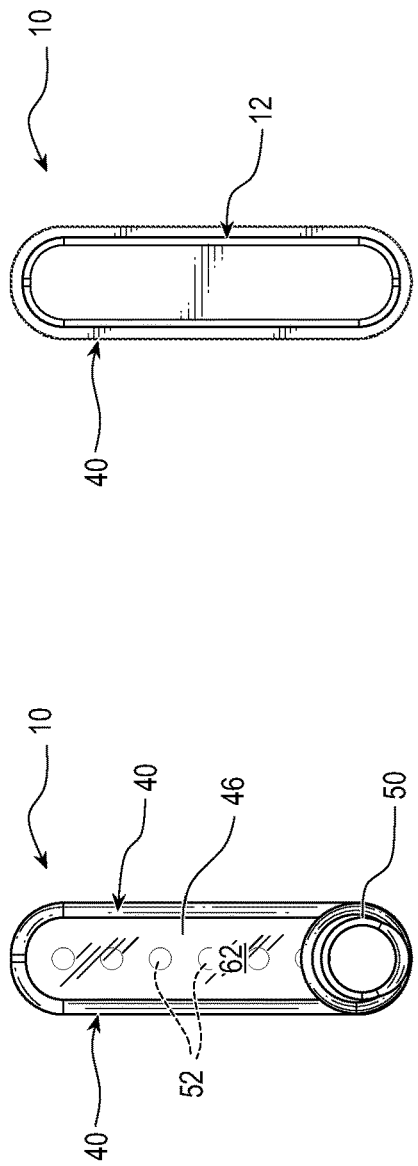
*FIG. 15*
*FIG. 16*

REUSEABLE STRAW CADDY

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

NOTICE REGARDING COPYRIGHTED MATERIAL

A portion of disclosing this patent document contains material subject to copyright protection and/or copyright registration. The copyright owner has no objection to the facsimile reproduction by anyone of the patent document or the patent disclosure as it appears in the file or records maintained by the United States Patent and Trademark Office, but the copyright owner otherwise reserves all copyright rights.

TECHNICAL FIELD

The present application generally relates to an apparatus for carrying and dispensing cleaned reusable drinking straws.

BACKGROUND OF THE INVENTION

In bars and restaurants, many people prefer to drink beverages or drinks using a straw. Similarly, many reusable drinking vessels are provided with drinking straws. Hence, the straw plays an active role in our daily life due to its high availability. Further, if the straw is a reusable straw, then a user or business needs to clean the straw before using it again. It is difficult to segregate and efficiently dispense cleaned reusable drinking straws without contaminating the cleaned straws. It would be a benefit, therefore, to have a reusable drinking straw caddy apparatus, system, and method that could segregate, hold, and dispense a cleaned reusable drinking straw.

State and local ordinances to eliminate the use of disposable or plastic straws are proliferating to improve the environment. Bar and restaurant owners are using non-disposable drinking straws manufactured principally from metal alloys safe for human use, such as stainless steel. These reusable non-disposable drinking straws are prone to bacteriological and moisture contamination which present a challenge to maintain an inventory of sanitary non-disposable drinking straws. Since the Covid-19 Pandemic, those establishments continuing to serve the public face an even higher priority to maintain the integrity of cleaned reusable drinking straws.

Once reusable drinking straws have been adequately cleaned within a bar or restaurant establishment, the reusable straws must be segregated from contaminated environments within the establishment and maintained in the cleaned state until the next use by patrons of the establishment.

Thus, there is a need for a cleaned reusable drinking straw apparatus that would provide a sterile environment to house the cleaned reusable drinking straws and that would dispense the cleaned reusable drinking straw for the next use by patrons of a bar or restaurant.

There likewise is a need for an apparatus to store cleaned reusable drinking straws and singularly dispense a cleaned straw for use with little or no contact by the server.

There likewise is a need for a simple, inexpensive, and durable hand-held apparatus for storing and dispensing cleaned reusable drinking straws.

DISCLOSURE OF INVENTION

An embodiment of the reusable cleaned drinking straw caddy includes a caddy bottom element providing two equal sized first external planar sides connected by two equal sized first external curved sides, two equal sized second external planar sides connected by two equal sized second external curved sides, and a flat bottom portion. The equal sized second external planar sides and the equal sized second external curved sides extend beyond the two equal sized first external planar sides connected by two equal sized first external curved sides to define a caddy bottom element internal space and open top portion.

An embodiment of the reusable cleaned drinking straw caddy further includes a caddy top element providing two equal sized planar sides connected by two equal sized curved sides, and a flat top portion comprising a cylindrical opening and extended cylindrical flange on one flat top portion end, defining a caddy top element open bottom end and enclosed top element space accessible through the cylindrical opening. A plurality of equal sized posts aligned along the caddy top element inside surface extend longitudinally into the caddy element top element internal space. The caddy top element open bottom end is sized to receive and connect to the caddy bottom element equal sized second external planar sides and the equal sized second external curved sides allowing the caddy top element internal space to communicates with the caddy bottom element internal space.

An embodiment of the reusable cleaned drinking straw caddy provides an internal space sized to receive and align a plurality of equal sized cleaned reusable drinking straws vertically and side-by-side, such that the equal sized cleaned reusable drinking straws can move in unison vertically within the reusable drinking straw caddy by longitudinal planar shaking the reusable drinking straw caddy with the reusable drinking straw caddy position so the flange is at the front bottom of the reusable drinking straw caddy. As the cleaned reusable drinking straws shift to the end of the top element, all cleaned reusable drinking straws above the bottom cleaned reusable drinking straw is engaged by a post. By tipping the reusable drinking straw caddy flange downwards, the bottom cleaned reusable drinking straw is single-handedly dispensed from the reusable drinking straw caddy through the cylindrical opening and flange.

BRIEF DESCRIPTION OF DRAWINGS

These and other features, aspects, and advantages of the apparatus for storing, transporting, and dispensing cleaned reusable drinking straws will become better understood regarding the following description, and drawings as further described.

FIG. 5A are cross sectional views of the bottom element 14 and the top element 40 of the reusable straw caddy 10 of FIG. 2 taken at "5A-5A", respectively.

FIG. 5B is a cross sectional view of the bottom element 14 and the top element 40 of the reusable straw caddy 10 of FIG. 1 taken at "5B-5B".

FIG. 6A is a cross sectional view of the bottom element 14 and the top element 40 of the reusable straw caddy 10 of FIG. 3 taken at "6A-6B".

FIG. 6B is a cross sectional view of the bottom element 14 and the top element 40 of the reusable straw caddy 10 of FIG. 4 taken at "6B-6B".

FIG. 7 is a top right front perspective view of the reusable straw caddy 10 for housing and dispensing cleaned reusable drinking straws of FIG. 1 depicting how the top element 40 of the reusable straw caddy 10 receives the bottom element 14 of the reusable straw caddy 10.

FIG. 14 is a left side elevational view of the embodiment of the reusable straw caddy 10 of FIG. 9.

FIG. 15 is a front elevational view of the embodiment of the reusable straw caddy 10 of FIG. 14.

FIG. 16 is a rear elevational view of the embodiment of the reusable straw caddy 10 of FIG. 14.

BEST MODE FOR CARRYING OUT THE INVENTION

Figure 1:
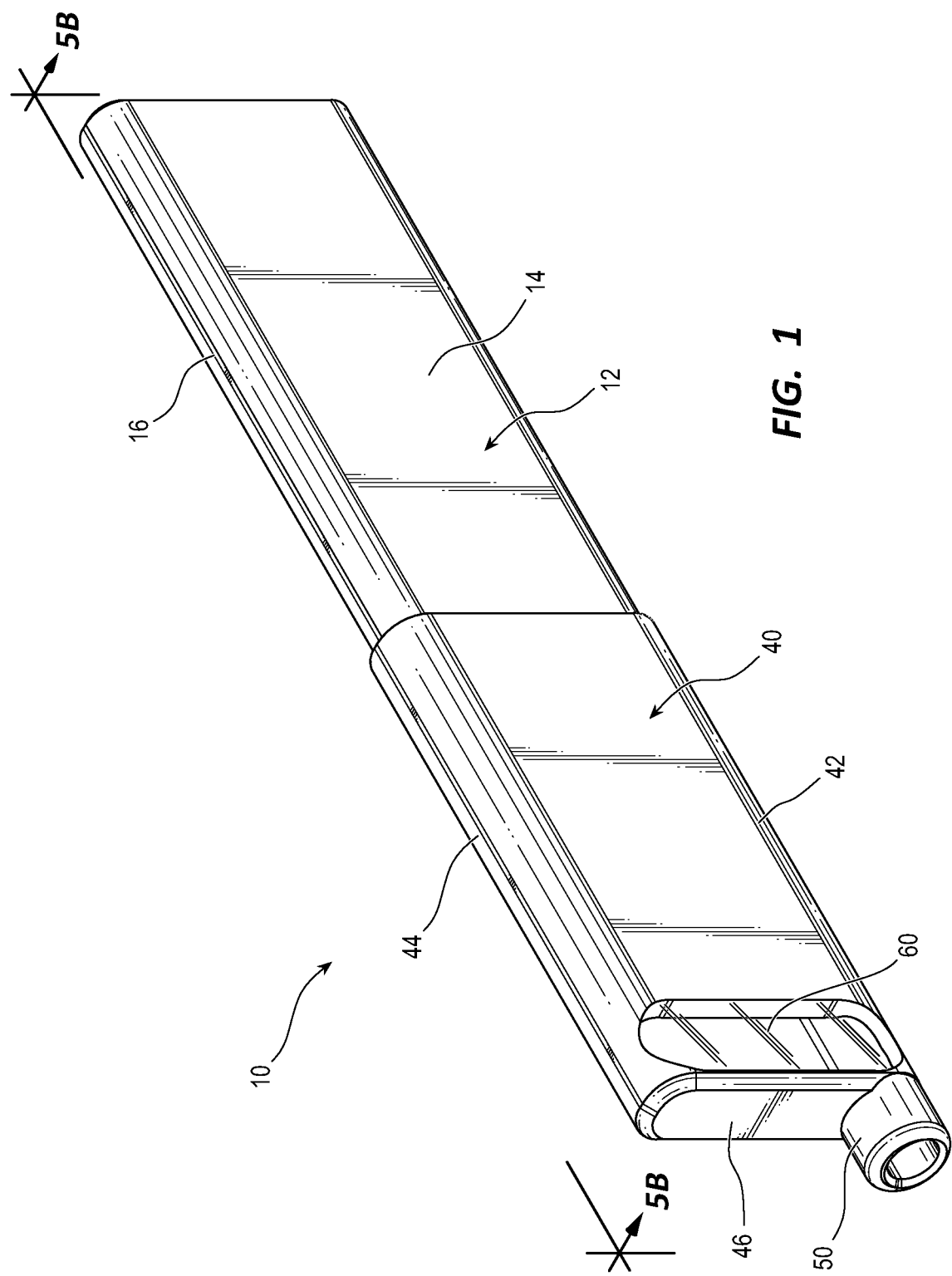
FIG. 1 is a top right front perspective view of an embodiment of the reusable straw caddy 10 for housing and dispensing cleaned reusable drinking straws.

Embodiments of a reusable straw caddy 10 for housing and dispensing cleaned reusable drinking straws are disclosed generally in FIGS. 1-16.

An embodiment of the reusable straw caddy 10 includes a caddy bottom element 12 providing two equal sized first external planar sides 14 connected by two equal sized first external curved sides 16, FIGS. 1-10. The caddy bottom element further provides two equal sized second external planar sides 18 connected by two equal sized second external curved sides 20, and a flat bottom portion 22, FIGS. 2, 5A, 5B, 7-10, and 16. The equal sized second external planar sides 18 and the equal sized second external curved sides 20 extend beyond the two equal sized first external planar sides 14 connected by two equal sized first external curved sides 16 to define a caddy bottom element internal space 24 and open top portion 26, FIGS. 2 and 7.

An embodiment of the reusable cleaned drinking straw caddy 10 further includes a caddy top element 40 providing two equal sized planar sides 42 connected by two equal sized curved sides 44, and a flat top portion 46 comprising a cylindrical opening 48 and extended cylindrical flange 50 on one flat top portion 46 end, defining a caddy top element open bottom end and enclosed top element space accessible through the cylindrical opening 48, FIGS. 1-16. A plurality of equal sized posts 52 are aligned along the caddy top element inside surface to extend longitudinally into the caddy element top element internal space 54, FIGS. 5A-6B. The caddy top element open, bottom portion 56 is sized to receive and connect to the caddy bottom element 12 equal sized second external planar sides 18 and the equal sized second external curved sides 20 allowing the caddy top element internal space 54 to communicate with the caddy bottom element internal space 24, FIGS. 1-16.

Figure 2:
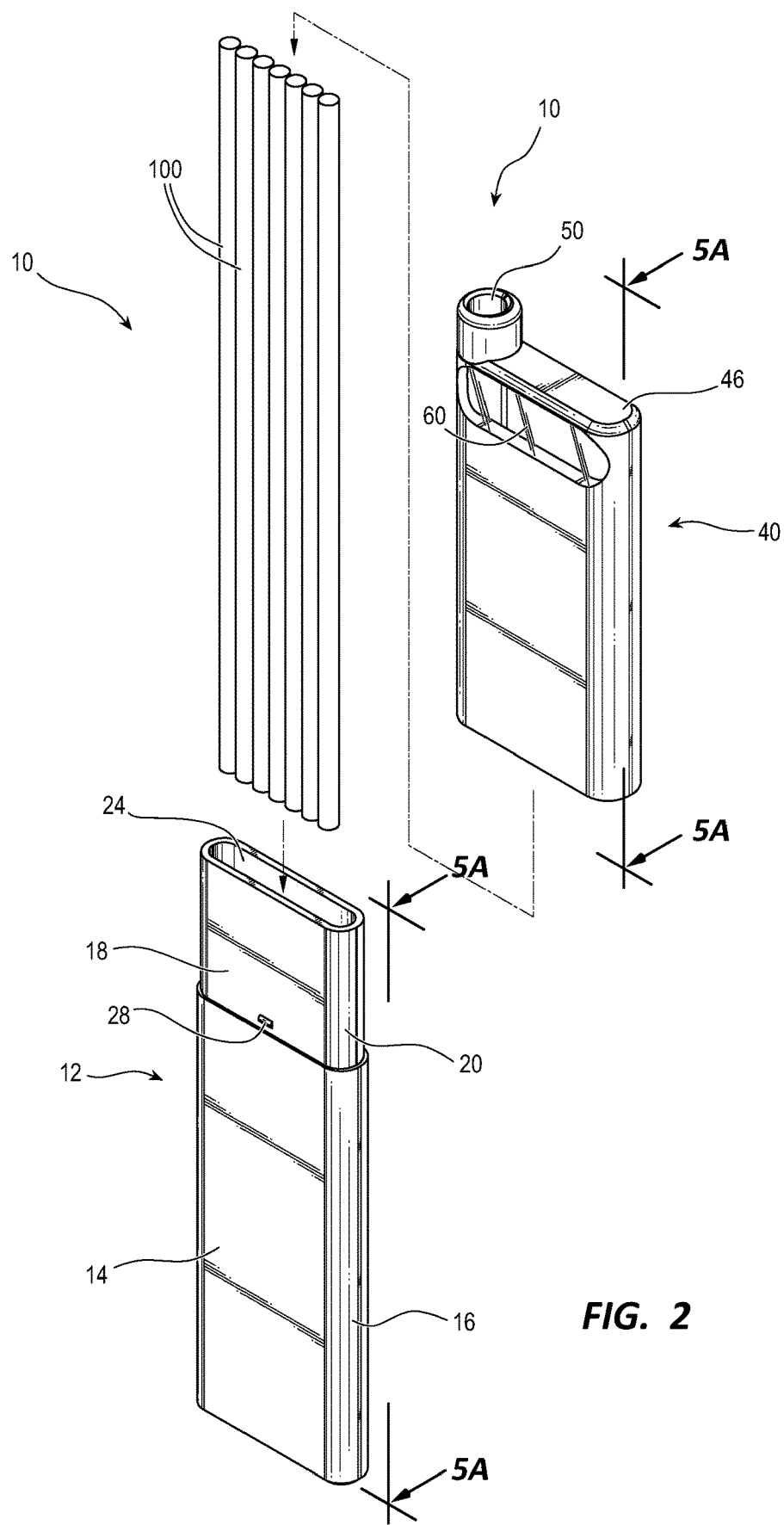
FIG. 2 is an exploded left front top view of the reusable straw caddy 10 of FIG. 1 depicting loading the bottom element 14 of the reusable straw caddy 10 with a plurality of cleaned reusable drinking straws 100 and then closing the top element 40 of the reusable straw caddy 10 over the cleaned reusable drinking straws 100 and the top portion of the bottom element 14 of the reusable straw caddy 10.

An embodiment of the reusable cleaned drinking straw caddy 10 is sized so the caddy top element internal space 54 and the caddy bottom element internal space 24 can hold a plurality of cleaned reusable drinking straws 100 aligned longitudinally, side-by-side, FIGS. 2, and 6A-6B.

Figure 3:
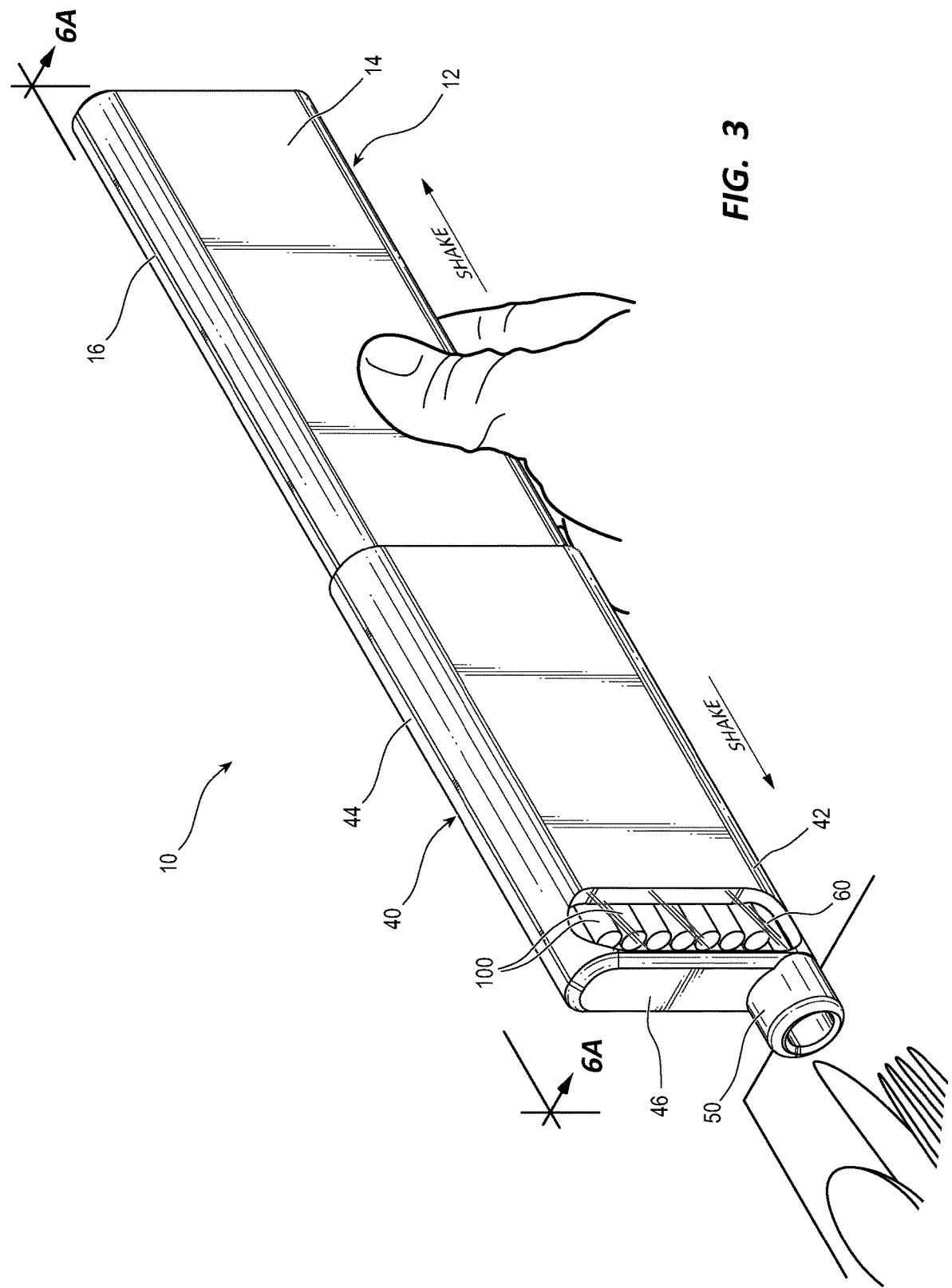
FIG. 3 is a top right front perspective view of the reusable straw caddy 10 of FIG. 2 depicting longitudinal shaking motion of the reusable straw caddy in a user's hand.
Figure 4:
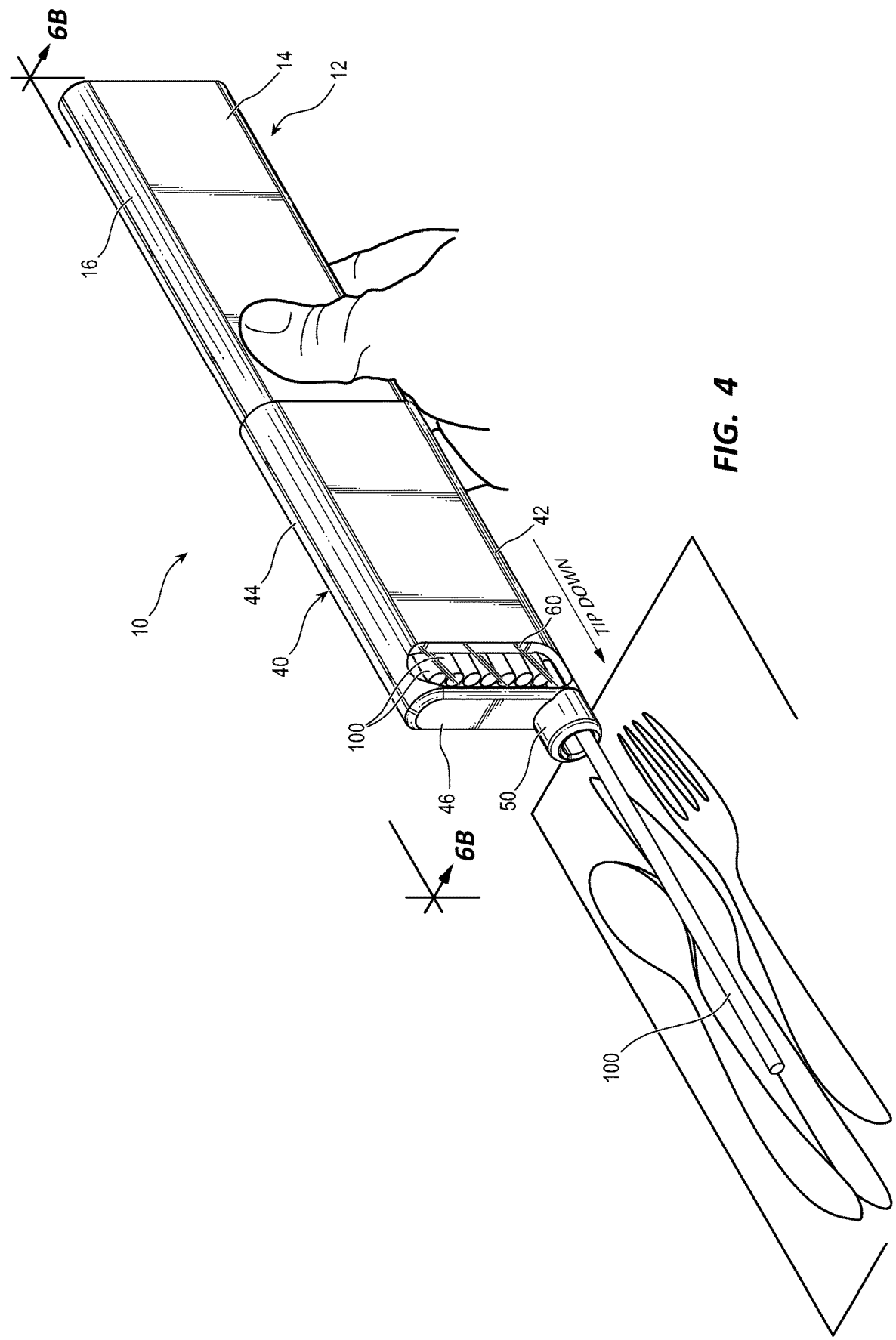
FIG. 4 is a top right front perspective view of the reusable straw caddy 10 of FIG. 3 depicting discharge of a single cleaned reusable drinking straw 100 by tipping the front end of the reusable straw caddy 10 downward.
Figure 8:
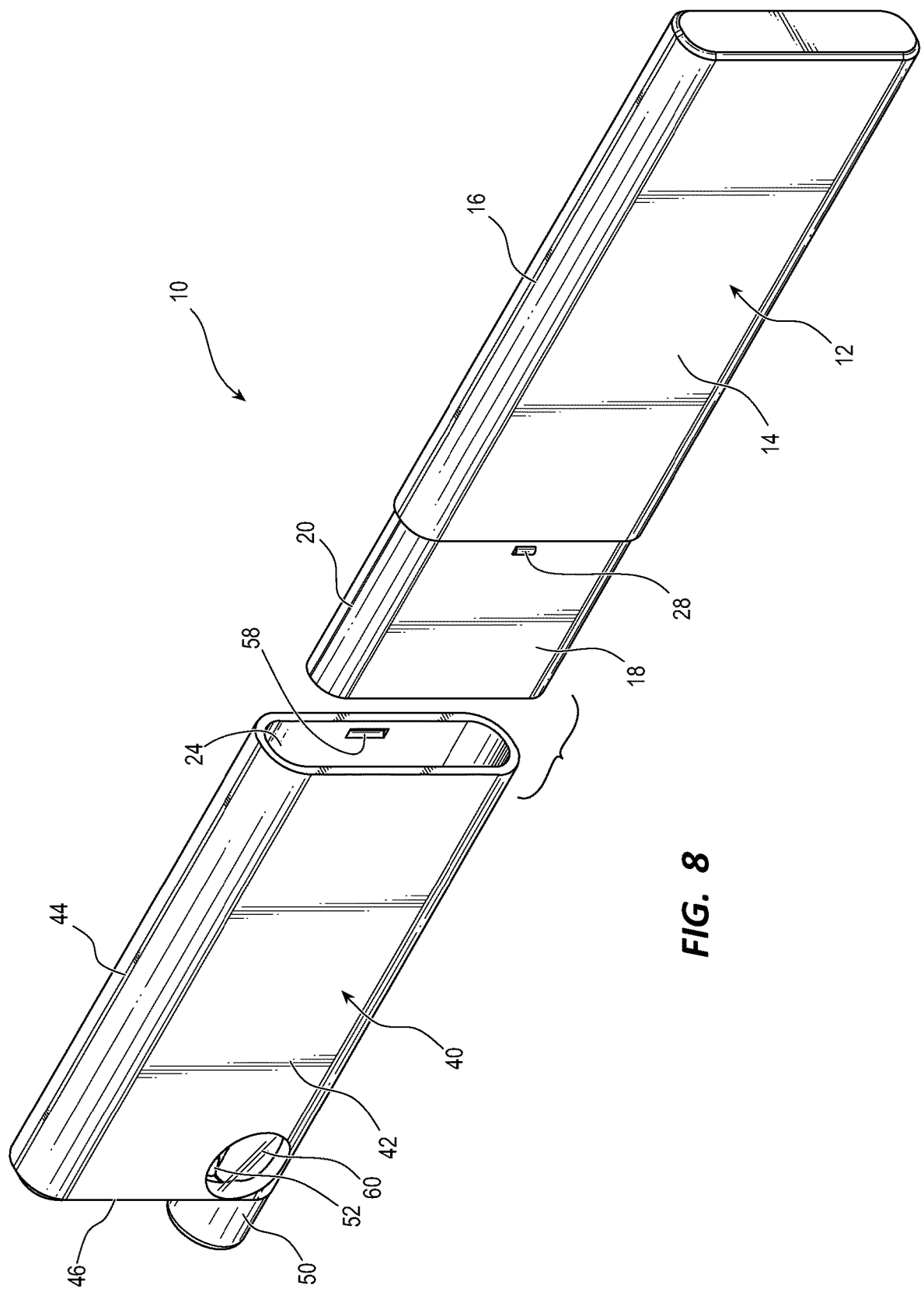
FIG. 8 is a top right rear perspective view of the reusable straw caddy 10 for housing and dispensing cleaned reusable drinking straws of FIG. 1 depicting how the bottom element 14 of the reusable straw caddy 10 fits into the top element 40 of the reusable straw caddy 10.
Figure 9:
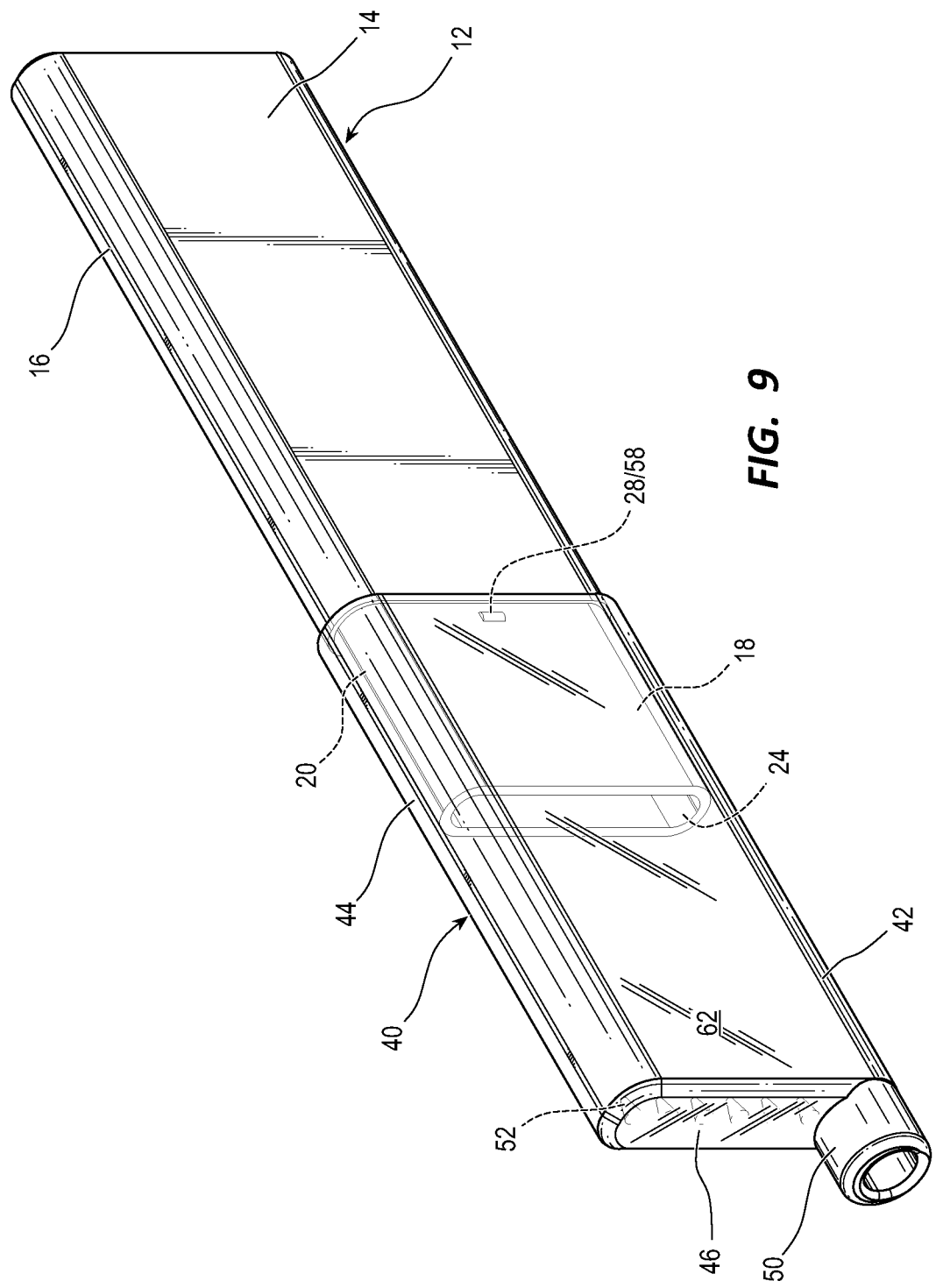
FIG. 9 is a top right front perspective view of an embodiment of the reusable straw caddy 10 for housing and dispensing cleaned reusable drinking straws having a translucent top element 40.
Figure 10:
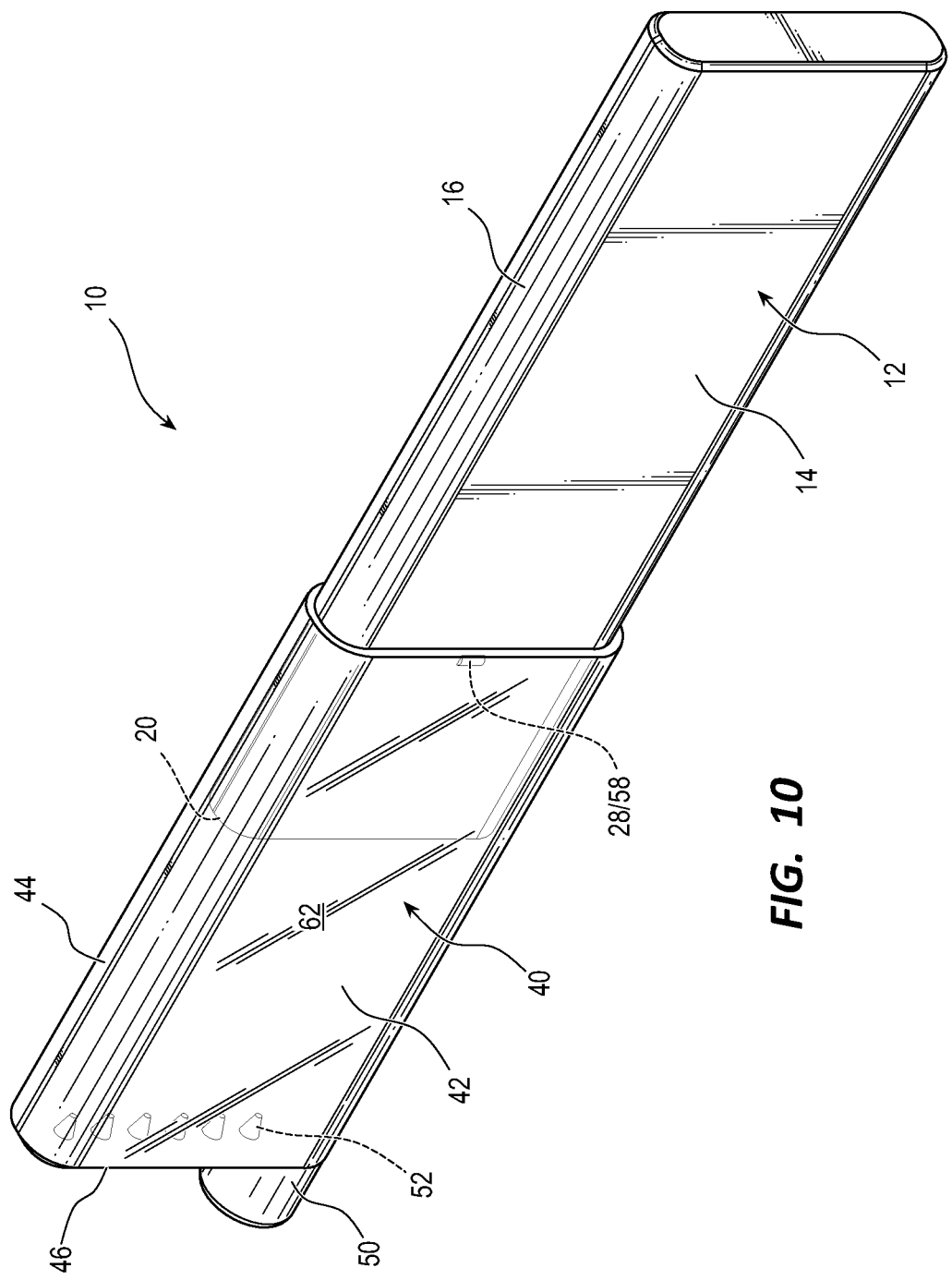
FIG. 10 is a top right rear perspective view of the embodiment of the reusable straw caddy 10 of FIG. 9.
Figure 12:
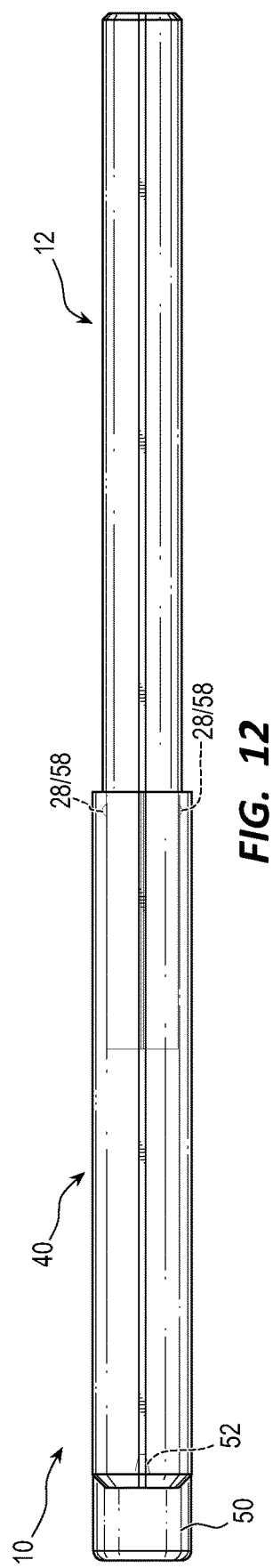
FIG. 12 is top plan view of the embodiment of the reusable straw caddy 10 of FIG. 11.
Figure 11:
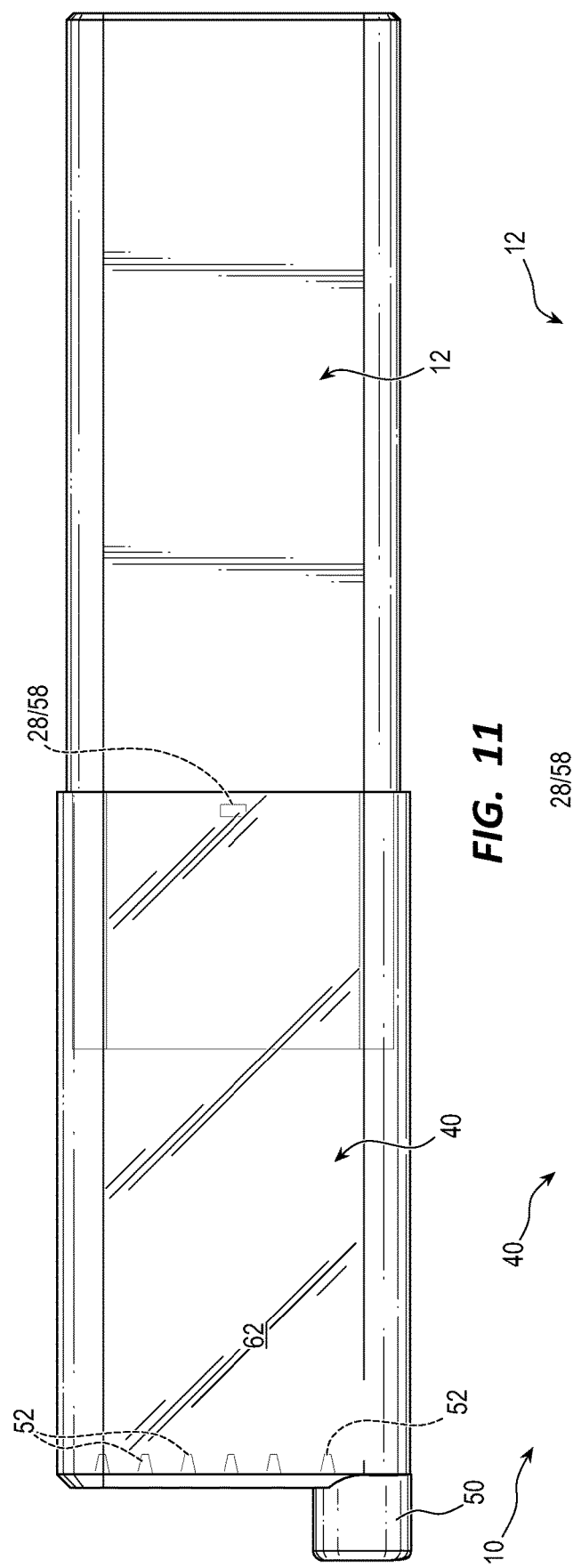
FIG. 11 is a right side elevational view of the embodiment of the reusable straw caddy 10 of FIG. 9.
Figure 13:
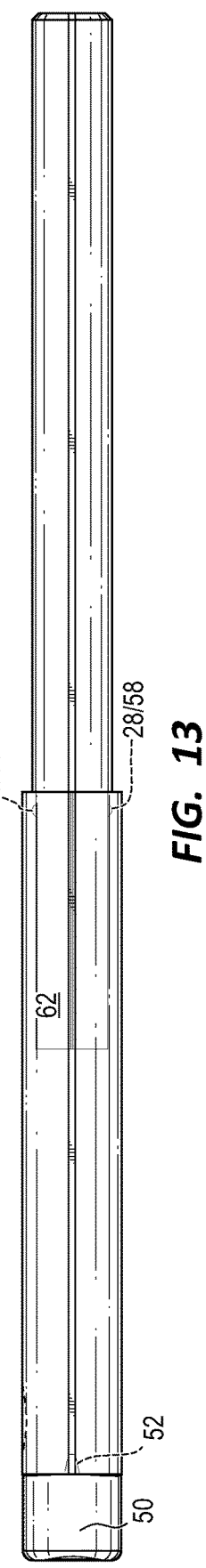
FIG. 13 a bottom plan view of the embodiment of the reusable straw caddy 10 of FIG. 11.

Shaking the reusable straw caddy 10 loaded with a plurality of cleaned reusable drinking straws along a longitudinal plane parallel to the caddy planar sides 14 and 42, FIG. 3, with the top portion cylindrical flange 50 on the bottom of the reusable straw caddy 10, allows a user to single-handedly segregate a bottom cleaned reusable straw 100 from the array of other cleaned reusable drinking straws that are each separately engaged on cleaned reusable straw a forward end by a separate post 52. The segregated cleaned reusable straw can be single-handedly dispensed from the reusable straw caddy 10 through the cylindrical opening 48 and cylindrical flange 50 and deposited into a sterile environment such as cleaned cutlery on a cleaned napkin, FIG. 4, by tipping the cylindrical flange 50 downward. The process can be repeated until the reusable straw caddy 10 is emptied and the cleaned reusable straws 100 and cutlery have been provided at the table on the patron's separate sterile napkins with the cutlery setting to restaurant or bar patrons requesting a drinking straw.

An embodiment of the reusable straw caddy 10 provides at least one window 50 near the straw discharge end of the reusable straw caddy 10 to provide the user with a view of the alignment of straws near the discharge end and a quick count on how many straws remain in the caddy, FIGS. 1-8.

An embodiment of the reusable straw caddy 10 provides a translucent caddy top element 40 and a wraparound window 50 near the straw discharge end of the reusable straw caddy 10 to provide the user with a view of the alignment of straws near the discharge end and a quick count on how many straws remain in the caddy, FIGS. 9-16.

An embodiment of the reusable straw caddy 10 is 9.25 inches long, 2.125 inches wide, and 0.875 inches deep to accommodate seven vertically aligned, side-by-side straight, cleaned reusable drinking straws 100 each 8.5 inches in length with 0.24 inches external diameter and 4.7 millimeter internal diameter, FIGS. 2, 6A and 6B. For this embodiment of the top element, each equal sized post 52 is sized to engage and release a single vertically aligned straw 100 as the reusable straw caddy is shaken to redirect the next cleaned reusable drinking straw 100, FIGS. 3-4, into a position of discharge from the caddy.

Embodiments of the reusable straw caddy 10 can be manufactured using three-dimensional printing or injection molding.

The translucent top element 40 of the reusable straw caddy 10 is made from polylactic acid, a bioplastic, using three-dimensional printing or injection molding.

I claim:

1. A reusable straw caddy comprising, in combination:
   A) a caddy bottom element comprising two equal sized first external planar sides connected by two equal sized first external curved sides, two equal sized second external planar sides connected by two equal sized second external curved sides, and a flat bottom portion, wherein the equal sized second external planar sides and the equal sized second external curved sides extend beyond the two equal sized first external planar sides connected by two equal sized first external curved sides to define a caddy bottom element internal space and open top portion;
   B) a caddy top element comprising two equal sized planar sides connected by two equal sized curved sides, and a flat top portion comprising a cylindrical opening and extended cylindrical flange on one flat top portion end, defining a caddy top element open bottom end and enclosed top element space accessible through the cylindrical opening, an array of six equal sized posts aligned along a caddy top element inside surface to extend longitudinally into the caddy element top element internal space, wherein the caddy top element open bottom end is sized to receive and connect to the caddy bottom element equal sized second external planar sides and the equal sized second external curved sides whereby the caddy top element internal space communicates with the caddy bottom element internal space;
   C) indents on the caddy bottom second external planar sides near a boundary of the caddy bottom second external planar sides and the caddy bottom first external planar sides;
   D) detents on an inside surface of the caddy top element equal sized planar sides near the caddy top element open bottom, the caddy top element detents sized to engage the indents on the caddy bottom second external planar sides to allow the caddy bottom element to be releasably connected to the caddy top element;
   whereby when a plurality of cleaned reusable straws have been longitudinally inserted into the caddy bottom internal space and the caddy top element is connected to the caddy bottom element and the caddy aligned so the cylindrical flange is at the bottom of the flat top portion is shaken once backwards and then once forwards along a plane corresponding to the caddy alignment in a user's hand, a single clean reusable straw can be singularly discharged from the caddy top element cylindrical opening aligned at the bottom of the caddy positioned in a user's hand and extended cylindrical flange by tipping the caddy top element down below the caddy bottom element whereby the equal sized posts hold the remaining cleaned straws in the reusable straw caddy and prevent remaining straws from impeding discharge of the singularly discharged clean reusable straw from the straw caddy.

2. The reusable straw caddy of claim 1 further comprising a window on both sides of the top element near the end of the top element supporting the cylindrical opening and cylindrical flange, the windows providing a view of the inventory of straws in the caddy and the straws held by the array of six equal sized posts aligned along the caddy top element inside surface.

3. The reusable straw caddy of claim 1 wherein the top element is manufactured from polylactic acid and three-dimensional printing.

4. The reusable straw caddy of claim 1 wherein the top element is manufactured from polylactic acid and injection molding.

5. The reusable straw caddy of claim 1 wherein the reusable straw caddy is 9.25 inches long, 2.125 inches wide, and 0.875 inches deep to accommodate seven vertically aligned, side-by-side straight, cleaned reusable drinking straws, each straw 8.5 inches in length with 0.24 inches external diameter and 4.7 millimeter internal diameter, and each equal sized post is sized to engage and release the inside diameter of a single straw.

6. The reusable straw caddy of claim 1 manufactured using three-dimensional printing.

7. The reusable straw caddy of claim 1 manufactured using injection molding.

8. The reusable straw caddy of claim 1 wherein reusable straw caddy is 9.25 inches long, 2.125 inches wide, and 0.875 inches deep and accommodates seven vertically aligned, side-by-side straight, cleaned reusable drinking straws, each straw 8.5 inches in length with 0.24 inches external diameter and 4.7 millimeter internal diameter.

9. A reusable straw caddy comprising, in combination:
   A) a three-dimensionally printed caddy bottom element comprising two equal sized first external planar sides connected by two equal sized first external curved sides, two equal sized second external planar sides connected by two equal sized second external curved sides, and a flat bottom portion, wherein the equal sized second external planar sides and the equal sized second external curved sides extend beyond the two equal sized first external planar sides connected by two equal sized first external curved sides to define a caddy bottom element internal space and open top portion;
   B) a three-dimensionally printed caddy top element comprising two equal sized planar sides connected by two equal sized curved sides, and a flat top portion comprising a cylindrical opening and extended cylindrical flange on one flat top portion end, defining a caddy top element open bottom end and enclosed top element space accessible through the cylindrical opening, an array of six equal sized posts aligned along a caddy top element inside surface to extend longitudinally into the caddy element top element internal space, at least one planar side window near the flat top portion, wherein the caddy top element open bottom end is sized to receive and connect to the caddy bottom element equal sized second external planar sides and the equal sized second external curved sides whereby the caddy top element internal space communicates with the caddy bottom element internal space;
   C) indents on the caddy bottom second external planar sides near a boundary of the caddy bottom second external planar sides and the caddy bottom first external planar sides;
   D) detents on an inside surface of the caddy top element equal sized planar sides near the caddy top element open bottom, the caddy top element detents sized to engage the indents on the caddy bottom second external planar sides to allow the caddy bottom element to be releasably connected to the caddy top element providing a reusable caddy 9.25 inches long, 2.125 inches wide, and 0.875 inches deep;

whereby when up to seven cleaned reusable straws 8.5 inches in length with 0.24 inches external diameter and 4.7 millimeter internal diameter have been longitudinally inserted into the caddy bottom internal space and the caddy top element is connected to the caddy bottom element and the caddy aligned so the cylindrical flange is at the bottom of the flat top portion is shaken once backwards and then once forwards along a plane corresponding to the caddy alignment in a user's hand, a single clean reusable straw can be singularly discharged from the caddy top element cylindrical opening aligned at the bottom of the caddy positioned in a user's hand and extended cylindrical flange by tipping the caddy top element down below the caddy bottom element whereby the equal sized posts hold the remaining cleaned straws in the reusable straw caddy and prevent remaining straws from impeding discharge of the singularly discharged clean reusable straw from the straw caddy.

10. The straw caddy of claim 9 wherein the top element is manufactured from polylactic acid.

11. A reusable straw caddy comprising, in combination:
   A) a three-dimensionally printed caddy bottom element comprising two equal sized first external planar sides connected by two equal sized first external curved sides, two equal sized second external planar sides connected by two equal sized second external curved sides, and a flat bottom portion, wherein the equal sized second external planar sides and the equal sized second external curved sides extend beyond the two equal sized first external planar sides connected by two equal sized first external curved sides to define a caddy bottom element internal space and open top portion;
   B) a three-dimensionally printed polylactic acid caddy top element comprising two equal sized planar sides connected by two equal sized curved sides, and a flat top portion comprising a cylindrical opening and extended cylindrical flange on one flat top portion end, defining a caddy top element open bottom end and enclosed top element space accessible through the cylindrical opening, an array of six equal sized posts aligned along a caddy top element inside surface to extend longitudinally into the caddy element top element internal space, wherein the caddy top element open bottom end is sized to receive and connect to the caddy bottom element equal sized second external planar sides and the equal sized second external curved sides whereby the caddy top element internal space communicates with the caddy bottom element internal space;
   C) indents on the caddy bottom second external planar sides near a boundary of the caddy bottom second external planar sides and the caddy bottom first external planar sides;
   D) detents on an inside surface of the caddy top element equal sized planar sides near the caddy top element open bottom, the caddy top element detents sized to engage the indents on the caddy bottom second external planar sides to allow the caddy bottom element to be releasably connected to the caddy top element providing a reusable caddy 9.25 inches long, 2.125 inches wide, and 0.875 inches deep;

whereby when up to seven cleaned reusable straws 8.5 inches in length with 0.24 inches external diameter and 4.7 millimeter internal diameter have been longitudinally inserted into the caddy bottom internal space and the caddy top element is connected to the caddy bottom element and the caddy aligned so the cylindrical flange is at the bottom of the flat top portion is shaken once backwards and then once forwards along a plane corresponding to the caddy alignment in a user's hand, a single clean reusable straw can be singularly discharged from the caddy top element cylindrical opening aligned at the bottom of the caddy positioned in a user's hand and extended cylindrical flange by tipping the caddy top element down below the caddy bottom element whereby the equal sized posts hold the remaining cleaned straws in the reusable straw caddy and prevent remaining straws from impeding discharge of the singularly discharged clean reusable straw from the straw caddy.

* * * * *